(12) United States Patent
Cramblitt

(10) Patent No.: US 8,559,753 B2
(45) Date of Patent: Oct. 15, 2013

(54) REFLECTION REMOVAL SYSTEM

(75) Inventor: Robert Merrill Cramblitt, Albuquerque, NM (US)

(73) Assignee: The Boeing Company, Chicago, IL (US)

( * ) Notice: Subject to any disclaimer, the term of this patent is extended or adjusted under 35 U.S.C. 154(b) by 83 days.

(21) Appl. No.: 13/243,053

(22) Filed: Sep. 23, 2011

(65) Prior Publication Data

US 2013/0077829 A1 Mar. 28, 2013

(51) Int. Cl.
*G06K 9/00* (2006.01)
*G06K 9/40* (2006.01)
*G06K 9/36* (2006.01)

(52) U.S. Cl.
USPC ............ 382/275; 382/141; 382/260; 382/280

(58) Field of Classification Search
USPC .................................. 382/141, 260, 280, 275
See application file for complete search history.

(56) References Cited

U.S. PATENT DOCUMENTS

| | | | | |
|---|---|---|---|---|
| 4,863,268 A * | 9/1989 | Clarke et al. | ............... | 356/237.2 |
| 5,726,705 A * | 3/1998 | Imanishi et al. | ................ | 348/92 |
| 5,841,530 A * | 11/1998 | Hewitt et al. | ............... | 356/237.1 |
| 6,417,919 B1 * | 7/2002 | Hewitt et al. | ............... | 356/237.1 |
| 6,526,665 B2 * | 3/2003 | Jackson | ...................... | 33/203.18 |
| 6,532,066 B1 * | 3/2003 | Filev et al. | .................. | 356/237.2 |
| 2003/0058434 A1* | 3/2003 | Hewitt et al. | ............... | 356/237.1 |
| 2010/0091272 A1* | 4/2010 | Asada et al. | ................ | 356/237.2 |
| 2010/0226560 A1* | 9/2010 | Mahajan et al. | .............. | 382/141 |

OTHER PUBLICATIONS

Robert Kogan, Sos Agaian and Karen Panetta Lentz, Visualization Using Rational Morphology and Zonal Magnitude-Reduction, 1998.*
M. R. Azimi "Digital Image Processing Lectures 21 & 22" 2009. http://www.engr.colostate.edu/ECE513/SP09/lectures/lectures21_22.pdf.*
Jain, Fundamentals of Digital Image Processing, Prentice Hall, Englewood Cliffs, NJ, 1989, 3 pages.

* cited by examiner

*Primary Examiner* — Utpal Shah
(74) *Attorney, Agent, or Firm* — Yee & Associates, P.C.

(57) ABSTRACT

A method and apparatus for removing undesired features in an image. The image is converted from a spatial domain to a frequency domain to form a transformed image. A filter is applied to the transformed image to form a filtered image in the frequency domain. The filtered image is converted from the frequency domain back into the spatial domain to form a modified image. An intensity of an undesired feature in the modified image is increased as compared to the intensity of the undesired feature in the image. The undesired feature is removed from the image using the modified image to form a processed image.

18 Claims, 7 Drawing Sheets

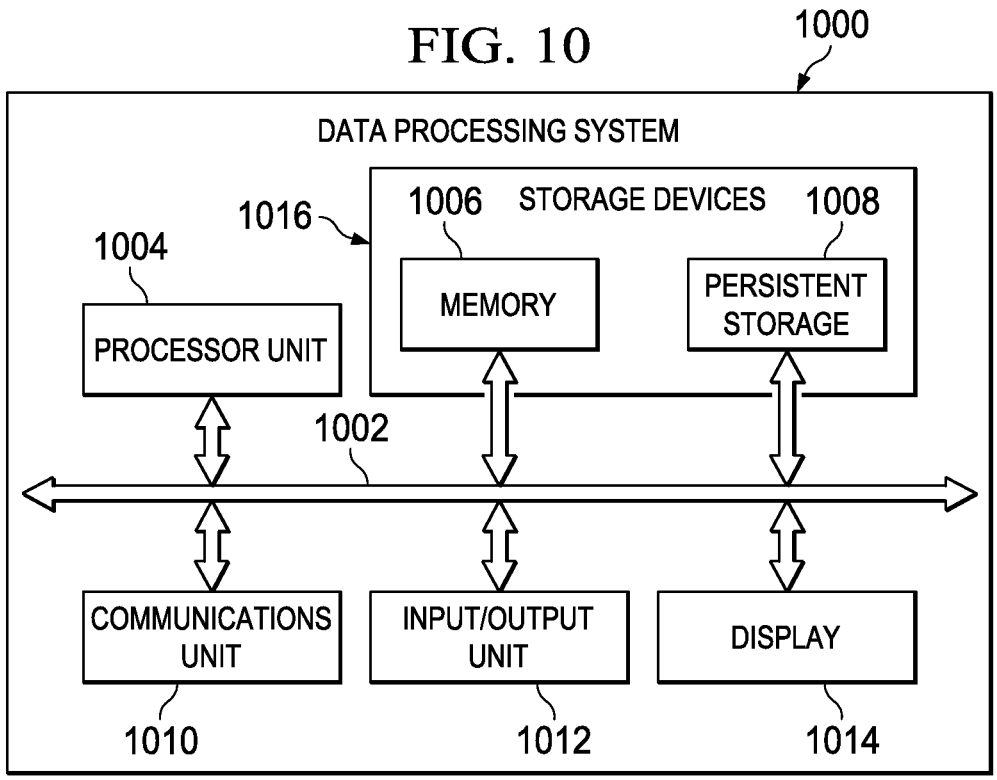
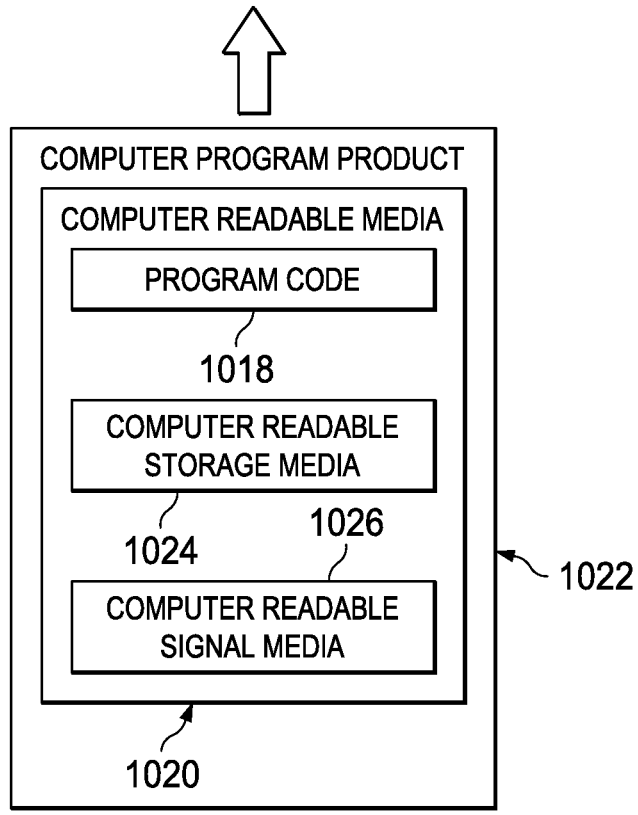
FIG. 10

REFLECTION REMOVAL SYSTEM

BACKGROUND INFORMATION

1. Field

The present disclosure relates generally to processing images and, in particular, to removing undesired features from images. Still more particularly, the present disclosure relates to a method and apparatus for removing undesired bright spots in an image.

2. Background

In some situations, undesired features may appear in images of scenes generated using a sensor system. For example, reflections of light off of surfaces in a scene may be detected by the sensor system and appear in the image generated for the scene as bright spots. Light may be reflected off of a surface when a ray of light hits the surface. This ray of light may also be referred to as an incident ray of light. Light may be reflected off of surfaces of various types of objects in a scene. These objects may include, for example, without limitation, people, buildings, aircraft, automobiles, leaves, manmade structures, and other suitable types of objects.

Reflections of light off of surfaces may be categorized as diffuse reflections or specular reflections. A diffuse reflection occurs when an incident ray of light is reflected off of a surface in multiple directions.

A specular reflection occurs when an incident ray of light is reflected off of a surface primarily in a single direction. In particular, a specular reflection occurs when the incident ray of light and the reflected ray of light have the same angle relative to an axis perpendicular to the surface. A specular reflection in a scene may appear as a bright spot in an image generated by a sensor system. A bright spot may be an area in the image in which the pixels in that area have intensity values greater than some selected threshold for brightness.

When the specular reflection is caused by light being reflected off of a large area of the surface, this reflection may be referred to as "glare". When the specular reflection is light reflected off of a small facet of the surface, this reflection may be referred to as a "glint". A glint may appear as a small feature in the image having a large intensity relative to the portion of the image surrounding the feature. In other words, a glint may appear as a small bright spot in the image. Typically, bright spots in images caused by glints are undesirable features in images.

When these types of undesirable features occur in an image, identifying and/or analyzing characteristics of objects in an image of a scene may be made more difficult than desired. For example, when an image is generated for an object, identification of the object may be more difficult than desired or may take more time than desired when undesired features are present in the image. These undesired features may make it more difficult to identify characteristics of the object that are used to identify the object itself.

As another example, if successive images are taken of the object at different times, those images may be compared to each other to determine whether changes are present in the object. The images may be used to determine whether inconsistencies may have occurred in subsequent images of the object. The presence of undesired features in these images, such as bright spots caused by glints, may make the identification of inconsistencies more difficult and time-consuming than desired.

Some currently available systems for reducing glints in images use high speed mechanical optics attached to imaging systems. These mechanical optics may include, for example, polarizers and optical filters. These types of mechanical optics may reduce the overall transmission of light through an imaging system. Reducing the transmission of light may reduce the amount of information provided in the images generated by the imaging system. Further, these types of mechanical optics may increase the weight and cost of imaging systems more than desired.

Therefore, it would be advantageous to have a method and apparatus that takes into account at least some of the issues discussed above as well as possibly other issues.

SUMMARY

In one advantageous embodiment, a method for removing undesired features in an image is provided. The image is converted from a spatial domain to a frequency domain to form a transformed image. A filter is applied to the transformed image to form a filtered image in the frequency domain. The filtered image is converted from the frequency domain back into the spatial domain to form a modified image. An intensity of an undesired feature in the modified image is increased as compared to the intensity of the undesired feature in the image. The undesired feature is removed from the image using the modified image to form a processed image.

In another advantageous embodiment, an apparatus comprises a computer system. The computer system is configured to convert an image from a spatial domain to a frequency domain to form a transformed image. The computer system is further configured to apply a filter to the transformed image to form a filtered image in the frequency domain. The computer system is further configured to convert the filtered image from the frequency domain back into the spatial domain to form a modified image. An intensity of an undesired feature in the modified image is increased as compared to the intensity of the undesired feature in the image. The computer system is further configured to remove the undesired feature from the image using the modified image to form a processed image.

In yet another advantageous embodiment, a vehicle inspection system comprises a sensor system, an image processor, and an image analyzer. The sensor system is configured to generate images of a vehicle. The image processor is configured to receive an image from the sensor system. The image processor is further configured to convert an image from a spatial domain to a frequency domain to form a transformed image. The image processor is further configured to apply a filter to the transformed image to form a filtered image in the frequency domain. The image processor is further configured to convert the filtered image from the frequency domain back into the spatial domain to form a modified image. An intensity of an undesired feature in the modified image is increased as compared to the intensity of the undesired feature in the image. The image processor is further configured to remove the undesired feature from the image using the modified image to form a processed image. The image analyzer is configured to analyze the processed image to determine whether an inconsistency is present in the vehicle.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof will best be understood by reference to the following detailed description of an advantageous embodiment of the present disclosure when read in conjunction with the accompanying drawings, wherein:

FIG. 10 is an illustration of a data processing system in accordance with an advantageous embodiment.

DETAILED DESCRIPTION

Figure 1:
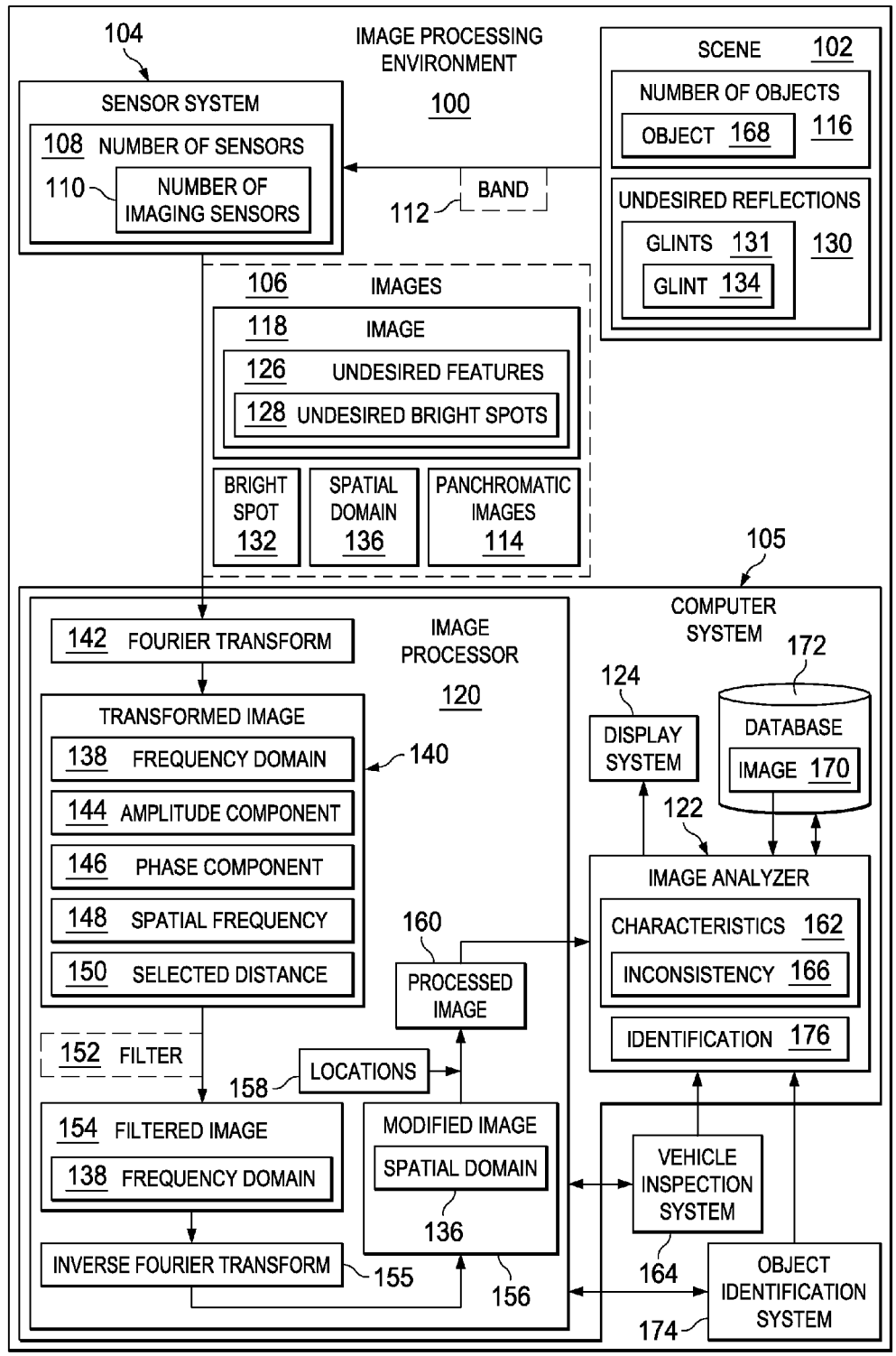
FIG. 1 is an illustration of an image processing environment in the form of a block diagram in accordance with an advantageous embodiment.

The different advantageous embodiments recognize and take into account one or more considerations. For example, the different advantageous embodiments recognize and take into account that images of a scene may be generated using different wavelengths. In other words, multiple wavelength measurements may be made for objects in the scene. By generating images of the scene using different wavelengths, features that appear in an image in response to reflections in the scene, such as glints, may be identified and removed from the images.

However, the different advantageous embodiments recognize and take into account that some sensors are unable to make these types of wavelength measurements. For example, panchromatic image sensors do not provide this type of information. A panchromatic image sensor may only provide a single band in which the image comprises data in shades of gray.

The different advantageous embodiments also recognize and take into account that filtering may be performed to suppress undesired features in the data for the image. The different advantageous embodiments, however, recognize and take into account that differentiating undesired features caused by glints from other features in the image for objects in the scene may be more difficult and/or time-consuming than desired.

Additionally, the different advantageous embodiments recognize and take into account that currently available systems for reducing glints that use high speed mechanical optics may not allow glints to be removed in images that were previously generated. For example, historical data used in the testing and evaluation of an object may include images from some number of weeks, months, or years prior to a current time. The different advantageous embodiments recognize and take into account that reducing glints in these previously generated images is desirable.

The different advantageous embodiments also recognize and take into account that currently available imaging systems that are configured to reduce glints may be unable to adapt to changing conditions, such as environmental conditions. For example, with currently available imaging systems equipped with polarizers configured to reduce glints in the images generated by the imaging system, adjusting the polarizers to take into account changing weather conditions, wind conditions, and/or other types of environmental conditions may not be possible. As a result, some portion of the images generated by the imaging system may have more glints than desired.

Further, some currently available systems for reducing glints may use motorized optical filters that adjust the polarization of the lens of an imaging system. The different advantageous embodiments recognize and take into account that these types of systems may be unable to process images being generated at higher frames per second. As a result, processing images in which glints have been reduced in substantially real-time may not be possible with currently available systems.

Thus, the different advantageous embodiments provide a method and apparatus for removing undesired features from an image that are caused by glints. In the different advantageous embodiments, an undesired feature may be a feature that makes analyzing the image more difficult and/or time-consuming than desired.

In one advantageous embodiment, a method for removing undesired features in an image is provided. An image is converted from a spatial domain to a frequency domain to form a transformed image. A filter is applied to the transformed image to form a filtered image in the frequency domain. The filtered image is converted from the frequency domain back into the spatial domain to form a modified image. An intensity of an undesired feature in the modified image is increased as compared to the intensity of the undesired feature in the image. The undesired feature is removed from the image using the modified image to form a processed image.

This information may then be used for a number of different purposes. For example, the processed image may be used to identify an object in a scene captured in the image, identify inconsistencies in the object, identify characteristics about the object, and/or perform other suitable operations with respect to the object in the image.

Turning now to FIG. 1, an illustration of an image processing environment in the form of a block diagram is depicted in accordance with an advantageous embodiment. In these illustrative examples, image processing environment 100 includes scene 102, sensor system 104, and computer system 105. Sensor system 104 may be configured to generate images 106 of scene 102.

As depicted, sensor system 104 may comprise number of sensors 108. As used herein, a number of items means one or more items. For example, "a number of sensors" means one or more sensors. In these illustrative examples, number of sensors 108 may take the form of number of imaging sensors 110 configured to detect electromagnetic radiation within band 112.

Band 112 may be a continuous range of frequencies or a continuous range of wavelengths. When band 112 is within the visible spectrum of electromagnetic radiation, number of imaging sensors 110 generates images 106 of scene 102 in the form of panchromatic images 114. When band 112 is within other portions of the spectrum of electromagnetic radiation, images 106 may be referred to as broadband images.

In these illustrative examples, images 106 take the form of panchromatic images 114. Panchromatic images 114 comprise only shades of gray ranging from black to white. In particular, the values for pixels in these types of images contain only intensity information. In other words, the values for pixels in panchromatic images 114 indicate intensity and not color.

As one illustrative example, number of objects 116 may be present in scene 102. Number of objects 116 in scene 102 may include, for example, without limitation, vehicles, aircraft, automobiles, people, buildings, manmade structures, roads, trees, a grassy patch of land, a surface of an ocean, a lake surface, and other suitable types of objects.

Number of imaging sensors 110 is configured to detect the brightness of number of objects 116 in scene 102 and generate image 118. Image 118 is a two-dimensional image in these illustrative examples. In particular, number of imaging sensors 110 measures the intensity of light in band 112 detected at number of imaging sensors 110 to generate a value for each pixel in image 118. The value may be, for example, between about 0 and about 255. In this manner, image 118 is a panchromatic image.

Sensor system 104 sends image 118 to computer system 105 for processing. In these illustrative examples, computer system 105 comprises a number of computers. When more than one computer is present in computer system 105, those computers may be in communication with each other.

As depicted, image processor 120 and image analyzer 122 are present in computer system 105. Image processor 120 and image analyzer 122 are modules that may be implemented using hardware, software, or a combination of the two in computer system 105. In some illustrative embodiments, these modules may be used independently from other components in computer system 105.

When these modules are implemented as hardware, the modules may be implemented using a number of circuits configured to perform desired functions and/or processes. These number of circuits may include, for example, at least one of an integrated circuit, an application-specific integrated circuit, a programmable logic array, a general logic array, a field programmable gate array, a programmable logic device, a complex programmable logic device, a programmable logic controller, a macrocell array, and other suitable types of circuits.

As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations.

Further, in these illustrative examples, computer system 105 also includes display system 124. Display system 124 may comprise one or more display devices. In these illustrative examples, the different components within computer system 105 may be located in the same location or in different locations, depending on the particular implementation.

In some illustrative examples, computer system 105 may be a distributed computer system, such as a network data processing system. In other illustrative examples, computer system 105 may be comprised entirely of hardware circuits in which processes may be implemented in hardware rather than in software.

In these illustrative examples, image processor 120 is configured to receive and process image 118. In particular, image processor 120 is configured to process image 118 to remove undesired features 126 from image 118. More specifically, image processor 120 processes image 118 to remove undesired features 126 from image 118 that are caused by undesired reflections 130 in scene 102. In particular, undesired reflections 130 may be glints 131.

Glints 131 are specular reflections of light off of surfaces in number of objects 116 in scene 102 that appear in image 118. A glint may appear in image 118 as a small bright spot in image 118 having a larger intensity as compared to the portion of image 118 surrounding the bright spot. In this manner, undesired features 126 caused by glints 131 in scene 102 take the form of undesired bright spots 128 in image 118. Image processor 120 may be unable to identify which of the bright spots in image 118 are caused by glints 131 using image 118 in its current form.

For example, image processor 120 may detect bright spot 132 in image 118. Bright spot 132 may include one pixel, two pixels, or some other suitable number of pixels. However, image processor 120 may be unable to determine whether bright spot 132 is caused by glint 134 in scene 102 and is one of undesired bright spots 128 in image 118. For example, the intensity of bright spot 132 in image 118 may not be high enough to determine whether bright spot 132 is caused by glint 134 in scene 102. As a result, image processor 120 may be unable to determine whether bright spot 132 is one of undesired bright spots 128 or a feature for one of number of objects 116 in scene 102.

In these illustrative examples, the current form of image 118 is in spatial domain 136. Spatial domain 136 is the image space for image 118. In particular, spatial domain 136 may be the two-dimensional space for image 118. In one illustrative example, spatial domain 136 may be defined using an x,y-coordinate system for image 118. The x-coordinates for image 118 may be for a horizontal direction for image 118, while the y-coordinates may be for a vertical direction for image 118.

Image processor 120 converts image 118 from spatial domain 136 to frequency domain 138 to form transformed image 140. In particular, image processor 120 may compute Fourier transform (FT) 142 for image 118 to convert image 118 from spatial domain 136 to frequency domain 138 to form transformed image 140. In these illustrative examples, Fourier transform 142 may be selected from one of a Discrete Fourier transform (DFT) and a Fast Fourier transform (FFT). When spatial domain 136 is a two-dimensional space, Fourier transform 142 also may be a two-dimensional Fourier transform.

In these illustrative examples, transformed image 140 comprises amplitude component 144 and phase component 146. Amplitude component 144 identifies the amplitudes of Fourier transform 142 for image 118. These amplitudes may also be referred to as magnitudes. Phase component 146 identifies the phases of Fourier transform 142 for image 118.

Amplitude component 144 may be represented by, for example, an amplitude spectrum. Phase component 146 may be represented by, for example, a phase spectrum. The amplitude spectrum and the phase spectrum plot the amplitudes and phases, respectively, of Fourier transform 142 with respect to frequency.

In these depicted examples, transformed image 140 has a same number of pixels as image 118. In particular, transformed image 140 may have the same dimensions in pixels as image 118.

Each pixel in transformed image 140 represents a different spatial frequency 148 in image 118. Spatial frequency 148 in image 118 is a rate of change for values of pixels in image 118 relative to neighboring pixels. In particular, spatial frequency 148 is defined as the number of changes in the intensity values for the pixels in image 118 per selected distance 150 in image 118 for a particular portion of image 118. Selected distance 150 may be in units of, for example, pixels, millimeters, centimeters, or some other suitable unit of distance with respect to transformed image 140.

In this manner, changes in position in transformed image 140 correspond to changes in spatial frequency 148. Further, the value for a pixel in transformed image 140 indicates a difference between a lightest gray level and a darkest gray level over selected distance 150 at the particular spatial frequency 148 represented by the pixel. This change from a lightest gray level to a darkest gray level over selected distance 150 is referred to as one period or one cycle.

For example, if a pixel in transformed image 140 representing spatial frequency 148 of 1 cycle every 10 pixels has a value of 20, then the intensity values for the pixels in image 118 over 10 pixels may vary from one of a lightest gray level to a darkest gray level and a darkest gray level to a lightest gray level. Further, the contrast between the lightest gray level and the darkest gray level may be about two times the value for the pixel. In other words, this contrast is about 40 gray levels between the lightest gray level and the darkest gray level.

In these depicted examples, smaller features in image 118 may have higher spatial frequencies as compared to larger features. As a result, smaller features in image 118 may be represented in higher frequency content in transformed image 140 as compared to the larger features in image 118.

In other words, these smaller features in image 118 may be represented in the pixels for transformed image 140 that correspond to higher spatial frequencies as compared to the larger features in image 118 that may be represented in the pixels for transformed image 140 that correspond to lower spatial frequencies. As one illustrative example, undesired bright spots 128 in image 118 caused by glints 131, which may be small features in image 118, may be represented in the high frequency content in transformed image 140.

In these illustrative examples, image processor 120 applies filter 152 to transformed image 140 to form filtered image 154 in frequency domain 138. Filter 152 may take the form of, for example, without limitation, a non-linear filter, a linear filter, a high-frequency pass filter, and/or some other suitable type of filter.

In these depicted examples, filter 152 may be configured to change amplitude component 144 for Fourier transform 142 for image 118 without changing phase component 146. In particular, filter 152 changes the amplitudes for high-frequency content in transformed image 140.

More specifically, when filter 152 is applied to transformed image 140, the amplitudes for high-frequency content in transformed image 140 are increased relative to the amplitudes for low-frequency content in transformed image 140. In other words, the ratio between the amplitudes for high-frequency content and the amplitudes for low-frequency content in filtered image 154 is reduced as compared to the ratio between the amplitudes for high-frequency content and the amplitudes for low-frequency content in transformed image 140.

In other words, the amplitudes for high-frequency content in transformed image 140 are enhanced in filtered image 154 such that the features in image 118 corresponding to this high frequency content also may be enhanced. In particular, the amplitudes for high frequency content corresponding to undesired bright spots 128 caused by glints 131 in image 118 are enhanced in filtered image 154.

Thereafter, image processor 120 computes inverse Fourier transform 155 for transformed image 140 to convert transformed image 140 in frequency domain 138 back into spatial domain 136. This conversion forms modified image 156. In particular, the intensities of small features, such as undesired bright spots 128 caused by glints 131, in modified image 156 may be increased as compared to the intensities of these features in image 118. In this manner, undesired bright spots 128 caused by glints 131 may be more easily distinguished in modified image 156 from other features as compared to image 118.

Image processor 120 then uses modified image 156 to remove undesired bright spots 128 caused by glints 131 from modified image 156. In particular, image processor 120 identifies locations 158 of undesired bright spots 128 in modified image 156 and then reduces and/or removes undesired bright spots 128 from locations 158 in image 118. In these illustrative examples, the reduction and/or removal of undesired bright spots 128 from modified image 156 forms processed image 160. In this manner, undesired bright spots 128 caused by glints 131 may be suppressed.

Image processor 120 sends processed image 160 to image analyzer 122 for analysis. Image analyzer 122 may analyze processed image 160 in a number of different ways. For example, image analyzer 122 may identify characteristics 162 for number of objects 116 using processed image 160. Characteristics 162 for number of objects 116 may include, for example, an inconsistency in an object, edges of an object, dimensions for an object, an identification of an object, and/or other suitable types of characteristics for an object in number of objects 116.

In some illustrative examples, image processor 120 and image analyzer 122 may be implemented in vehicle inspection system 164. Vehicle inspection system 164 is configured to determine whether inconsistency 166 is present in object 168 in number of objects 116 using processed image 160. Object 168 may be a vehicle in these illustrative examples. An inconsistency in object 168 may be a feature or characteristic present in object 168 that is not expected to be present or is undesired in object 168 in these illustrative examples.

Identifying inconsistency 166 may be performed in a number of different ways. For example, processed image 160 may be compared to image 170 stored in database 172. Image 170 is another image of object 168 generated prior to image 118 of object 168 being generated. This comparison of processed image 160 to image 170 may be used to determine whether inconsistency 166 is present.

In other illustrative examples, image processor 120 and image analyzer 122 may be implemented in object identification system 174. With this type of implementation, image analyzer 122 may compare image 170 to processed image 160 to generate identification 176 of object 168. In some cases, processed image 160 may be compared to multiple images present in database 172 to identify object 168.

In these illustrative examples, vehicle inspection system 164 and/or object identification system 174 may be configured to generate a display on display system 124 using the results of the analysis of processed image 160 performed by image analyzer 122. In some illustrative examples, image analyzer 122 may display an indication of inconsistency 166 in object 168 on display system 124.

In other illustrative examples, image analyzer 122 may generate a report containing an indication of whether inconsistency 166 is present in object 168, an identification of characteristics 162 for object 168, identification 176 of object 168, and/or other suitable information. This report may be, for example, displayed on display system 124, emailed to a client, stored in a database, and/or managed in some other suitable manner.

Further, depending on the implementation, image processor 120 and/or image analyzer 122 may be configured to display images on display system 124. For example, image processor 120 and/or image analyzer 122 may display any of image 118 and/or processed image 160 on display system 124.

The illustration of image processing environment 100 in FIG. 1 is not meant to imply physical or architectural limitations to the manner in which an advantageous embodiment may be implemented. Other components in addition to and/or in place of the ones illustrated may be used. Some components may be unnecessary. Also, the blocks are presented to illustrate some functional components. One or more of these blocks may be combined and/or divided into different blocks when implemented in an advantageous embodiment.

For example, in some illustrative examples, image analyzer 122 and image processor 120 may be located in different locations. For example, image processor 120 may be located in the same platform as sensor system 104, while image analyzer 122 may be located in some other platform remote to sensor system 104. In other illustrative examples, image processor 120 and image analyzer 122 may be implemented in a same module in computer system 105.

Further, although object 168 is described as a vehicle, object 168 may take a number of different forms. For example, object 168 may be selected from one of a mobile platform, a stationary platform, a land-based structure, an aquatic-based structure, a space-based structure, an aircraft, a surface ship, a tank, a personnel carrier, a train, a spacecraft, a space station, a satellite, a submarine, an automobile, a power plant, a bridge, a dam, a manufacturing facility, a building, a skin panel, an engine, a section of a gas pipeline, and other suitable objects.

Figure 2:
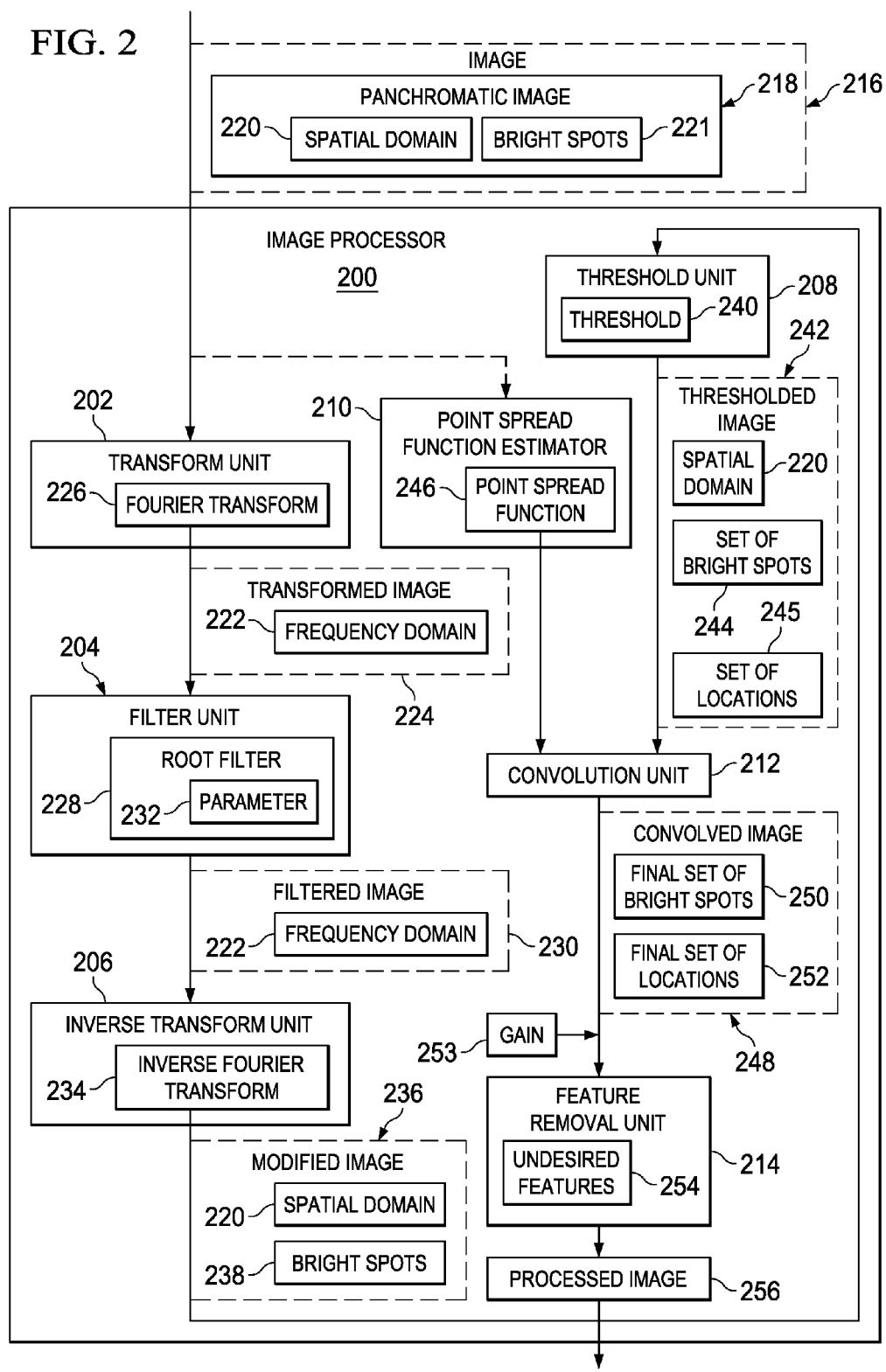
FIG. 2 is an illustration of an image processor in the form of a block diagram in accordance with an advantageous embodiment.

With reference now to FIG. 2, an illustration of an image processor in the form of a block diagram is depicted in accordance with an advantageous embodiment. In this illustrative example, image processor 200 is an example of one implementation for image processor 120 in FIG. 1. As depicted, image processor 200 includes transform unit 202, filter unit 204, inverse transform unit 206, threshold unit 208, point spread function estimator 210, convolution unit 212, and feature removal unit 214.

In this illustrative example, transform unit 202 receives image 216 from a sensor system, such as sensor system 104 in FIG. 1. Image 216 takes the form of panchromatic image 218 in this example. Further, image 216 is in spatial domain 220. Spatial domain 220 is a two-dimensional image space for image 216. In this depicted example, image 216 in spatial domain 220 may be represented by the function, H(x,y).

The function, H(x,y), for image 216 is a function for the values of the pixels in image 216 with respect to the x,y locations of the pixels in image 216. The pixels in image 216 may be arranged in rows and columns. In these illustrative examples, the x location of a pixel identifies a particular row, while the y location of the pixel identifies a particular column.

Bright spots 221 appear in image 216. Bright spots 221 are small features in image 216 having large intensities relative to the portions of image 216 surrounding bright spots 221. At least a portion of bright spots 221 may not have intensities large enough to distinguish between bright spots resulting from glints in the scene captured by image 216 and bright spots that are features of the objects in the scene. Image processor 200 is configured to process image 216 to make this distinction.

As depicted, transform unit 202 is configured to convert image 216 from spatial domain 220 to frequency domain 222 to form transformed image 224. In particular, transform unit 202 computes Fourier transform (FT) 226 for image 216 to form transformed image 224. Fourier transform 226 for image 216 may be represented by the function, H(u,v). The function, H(u,v), for image 216 is the function, H(x,y), for image 216 converted into frequency domain 222.

In this illustrative example, filter unit 204 receives transformed image 224 in frequency domain 222 from transform unit 202. Filter unit 204 applies root filter 228 to transformed image 224 to generate filtered image 230. In this depicted example, root filter 228 is a non-linear filter that uses parameter 232, α, to change the amplitude component for Fourier transform 226 for image 216 without changing the phase component for Fourier transform 226.

In particular, parameter 232, α, may be an exponent having a value between 0 and 1. Root filter 228 may raise the amplitude component of Fourier transform 226 to the power of parameter 232. This operation may be equivalent to taking the $\alpha^{th}$ root of the amplitude component of Fourier transform 226. In other words, filtered image 230 may be represented by the following equation:

$$F(u,v)=|H(u,v)|^{\alpha}e^{j\theta(u,v)}. \qquad (1).$$

where F(u,v) represents filtered image 230, |H(u,v)| is the amplitude component for Fourier transform 226 for image 216, u is a horizontal component for frequencies in frequency domain 222, v is a vertical component for frequencies in frequency domain 222, α is parameter 232 between 0 and 1, e is the exponential function, θ is a phase angle, and j is the square root of −1.

The value of parameter 232, α, may be selected such that amplitudes of the high frequency content in transformed image 224 are increased relative to the amplitudes of the low frequency content. In particular, the amplitudes of the high frequency content in transformed image 224 may be increased more than the amplitudes of the low frequency content in transformed image 224. In some cases, the amplitudes of the high frequency content may be decreased to a lesser extent than the amplitudes of the low frequency content in transformed image 224.

Filtered image 230 generated by filter unit 204 is sent to inverse transform unit 206. Inverse transform unit 206 computes inverse Fourier transform 234 for filtered image 230 in frequency domain 222 to convert filtered image 230 from frequency domain 222 back into spatial domain 220 in the form of modified image 236.

In this illustrative example, bright spots 238 appear in modified image 236. Bright spots 238 may be substantially the same as bright spots 221 in image 216. Bright spots 238 in modified image 236 in spatial domain 220 may have increased intensities as compared to bright spots 221 in image 216. In particular, bright spots 238 may have intensities that may allow bright spots resulting from glints in the scene captured by image 216 to be distinguished between bright spots that are features of the objects in the scene.

As depicted, threshold unit 208 receives modified image 236 from inverse transform unit 206. Threshold unit 208 is configured to apply threshold 240, $K_T$, to modified image 236. In particular, when threshold 240 is applied to modified image 236, pixels in modified image 236 having a value equal to or less than threshold 240, $K_T$, are set to have an amplitude of about zero or some minimum value, while pixels in modified image 236 having a value greater than threshold 240, $K_T$, are left unchanged to form thresholded image 242 in spatial domain 220.

Threshold 240 is selected such that any bright spots 238 that may be caused by glints in the scene captured in image 216 may be identified. For example, pixels in modified image 236 having a value greater than threshold 240, $K_T$, may be pixels for set of bright spots 244 in bright spots 238. As used herein, a set of items means zero or more items. For example, a set of items may be a null or empty set in some cases. In particular, set of bright spots 244 includes the bright spots from bright spots 238 that may be caused by glints in the scene captured in image 216. In some illustrative examples, set of bright spots 244 may be referred to as a set of glint points.

Set of bright spots 244 may be in set of locations 245 in thresholded image 242. In this depicted example, parameter 232 may be selected such that a bright spot in set of bright spots 244 may have a width of about one pixel. In particular, parameter 232 is selected such that the smallest bright spots in set of bright spots 244 may occupy about one pixel or less. Further, in some illustrative examples, threshold unit 208 may be configured to apply more than one threshold to modified image 236.

Convolution unit 212 is configured to convolve thresholded image 242 with point spread function 246 for image 216 to generate convolved image 248 in spatial domain 220. In this illustrative example, point spread function 246 may be generated by point spread function estimator 210. Point spread function 246 describes the response of the sensor system that generated image 216 to a point source or point object.

For example, a point feature in scene 102 of FIG. 1 may be a feature for an object in the scene that may occupy about one pixel in image 216 based on, for example, a distance between the sensor system and the object. However, the sensor system that generates image 216 may cause this point feature to be blurred in image 216 such that the point feature occupies more than one pixel. Point spread function 246 describes this blurring of the point feature. In other words, point spread function 246 describes the blurring of point features by the system that generated image 216. In these illustrative examples, point spread function 246 may take the form of a Gaussian function, $p(x,y)$.

In one illustrative example, point spread function estimator 210 estimates point spread function 246 using image 216. In other illustrative examples, point spread function estimator 210 may obtain point spread function 246 from user input, a database, or some other suitable source. For example, parameters for the sensor system that generated image 216 may be well-known, and point spread function 246 may already be defined for the sensor system.

In this illustrative example, convolution unit 212 convolves point spread function 246 with thresholded image 242 to generate convolved image 248 that estimates set of locations 245 for set of bright posts 244 to form final set of locations 252 for final set of bright spots 250. Final set of bright spots 250 in final set of locations 252 estimates the contribution of glints to image 216.

In particular, final set of locations 252 take into account the blurring effect of the sensor system. In other words, final set of locations 252 may be the locations that correspond to the locations of the corresponding bright points in bright spots 221 in image 216. The convolution of the estimated point spread function 246 and a function for thresholded image 242 in spatial domain 220 may be the integral of the product of these two functions after one is reversed and shifted.

As depicted, feature removal unit 214 is configured to receive convolved image 248. In some illustrative examples, gain 253 may be applied to convolved image 248 prior to convolved image 248 being received by feature removal unit 214. In these illustrative examples, gain 253 may be selected to account for the particular type of sensor system that generated image 216, interactions between glints in the scene that may affect the bright spots in image 216, and/or other suitable factors.

Feature removal unit 214 subtracts convolved image 248 from image 216. In other words, the portions of image 216 in locations in image 216 corresponding to final set of locations 252 of final set of bright spots 250 in convolved image 248 are removed from image 216 to form processed image 256. This removal is the removal of undesired features 254 from image 216. In particular, this removal is the removal of undesired features 254 caused by glints in the scene captured in image 216.

In this illustrative example, the removal of undesired features 254 may be performed by setting pixel values in the portions of image 216 in locations corresponding to final set of locations 252 of final set of bright spots 250 to zero or some minimum value other than zero. A minimum value other than zero may be selected to take into account that a bright spot in bright spots 221 in image 216 may be caused by other reflections in addition to glints. For example, the bright spot also may be caused by a diffused reflection.

Image processor 200 may send processed image 256 to an image analyzer, such as image analyzer 122 in FIG. 1. In this manner, analysis may be performed on processed image 256 in which undesired features 254 have been removed instead of image 216 in which undesired features 254 may still be present. The analysis of processed image 256 may be more accurate as compared to the analysis of image 216.

The illustration of image processor 200 in FIG. 2 is not to imply physical or architectural limitations to the manner in which an advantageous embodiment may be implemented. In these illustrative examples, image processor 200 may be implemented using other types of components in addition to and/or in place of the ones illustrated. Further, some components illustrated may be combined with other components, or functions may be further separated into additional components.

For example, threshold unit 208 may be implemented as part of feature removal unit 214. In some illustrative examples, a conversion unit may implement the functions performed by both transform unit 202 and inverse transform unit 206.

Figure 3:
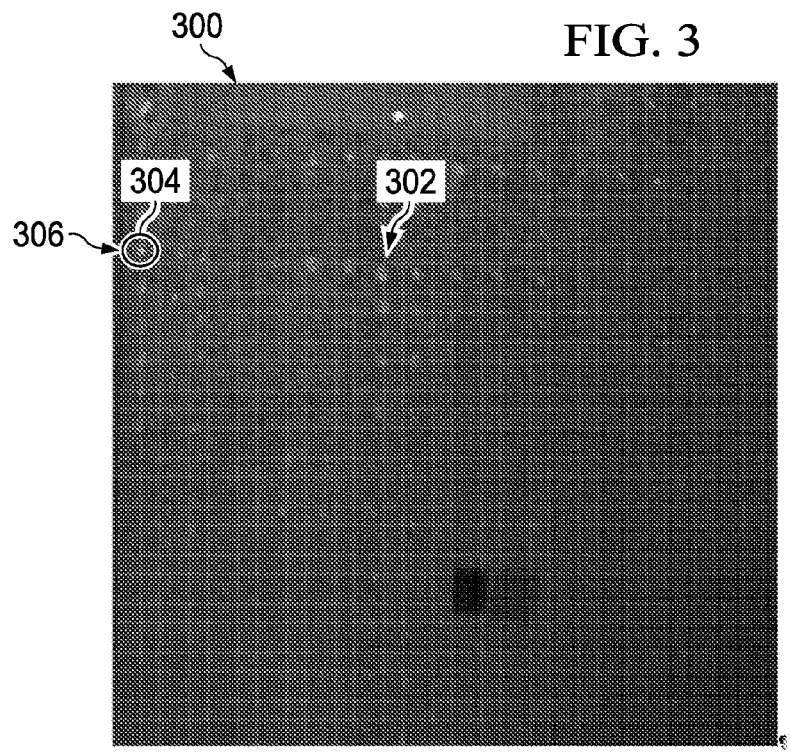
FIG. 3 is an illustration of a panchromatic image in accordance with an advantageous embodiment.

With reference now to FIG. 3, an illustration of a panchromatic image is depicted in accordance with an advantageous embodiment. Panchromatic image 300 is an example of one of images 106 in FIG. 1 and panchromatic image 218 in FIG. 2. Panchromatic image 300 is an image of a section of an aircraft fuselage. Panchromatic image 300 is an image in gray scale. As depicted, bright spots 302 are present in panchromatic image 300. At least a portion of bright spots 302 may be caused by glints in the scene captured in panchromatic image 300. Bright spot 304 is an example of one of bright spots 302 that is at least partially caused by a glint. Bright spot 304 is in location 306 in panchromatic image 300.

Figure 4:
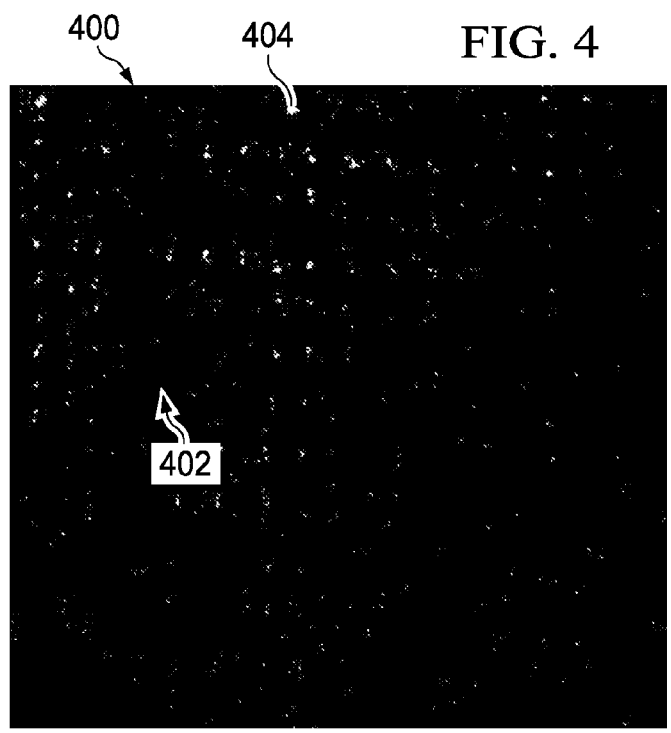
FIG. 4 is an illustration of a thresholded image in accordance with an advantageous embodiment.

With reference now to FIG. 4, an illustration of a thresholded image is depicted in accordance with an advantageous embodiment. Thresholded image 400 is an example of one implementation for thresholded image 242 in FIG. 2. In particular, thresholded image 400 is an example of the image produced by threshold unit 208 in FIG. 2 after processing of panchromatic image 300 in FIG. 3 by image processor 200 in FIG. 2.

As depicted, thresholded image 400 is a black and white image comprising pixels 402 having zero values and pixels 404 having non-zero values. Pixels 404 having non-zero values identify locations in thresholded image 400 that correspond to the locations of the portion of bright spots 302 in panchromatic image 300 in FIG. 3 caused by glints.

Figure 5:
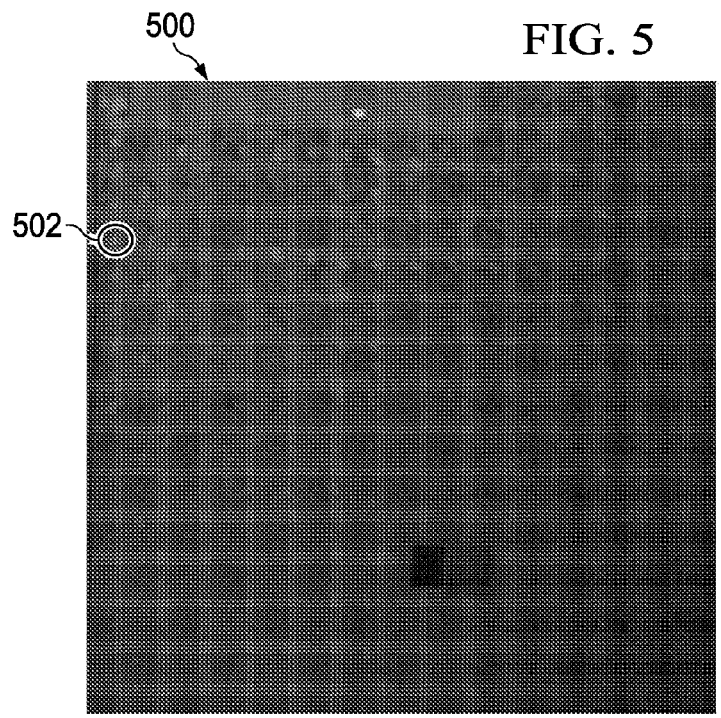
FIG. 5 is an illustration of a processed image in accordance with an advantageous embodiment.

With reference now to FIG. 5, an illustration of a processed image is depicted in accordance with an advantageous embodiment. Processed image 500 is an example of one implementation for processed image 256 in FIG. 2. In particular, processed image 500 is an example of the image generated by image processor 200 in FIG. 2 after panchromatic image 300 from FIG. 3 has been processed to remove undesired features from panchromatic image 300. These undesired features are the portion of bright spots 302 in panchromatic image 300 in FIG. 3 caused by glints.

In particular, thresholded image 400 from FIG. 4 may be convolved with the point spread function for panchromatic image 300 to form a convolved image. This convolution may be performed by convolution unit 212 in image processor 200 from FIG. 2. Feature removal unit 214 in image processor 200 in FIG. 2 may subtract the convolved image from panchromatic image 300 to generate processed image 500. As depicted, processed image 500 is an image in gray scale.

In this illustrative example, location 502 in processed image 500 corresponds to location 306 in panchromatic image 300. As depicted in processed image 500, the effects of glints off of the section of aircraft fuselage in processed image 500 have been substantially removed in location 502. In particular, the effects of glints have been substantially removed in location 502 as compared to location 306 in panchromatic image 300. Any brightness remaining in location 502 may be the effects of diffuse reflections off of the section of the aircraft fuselage.

Figure 6:
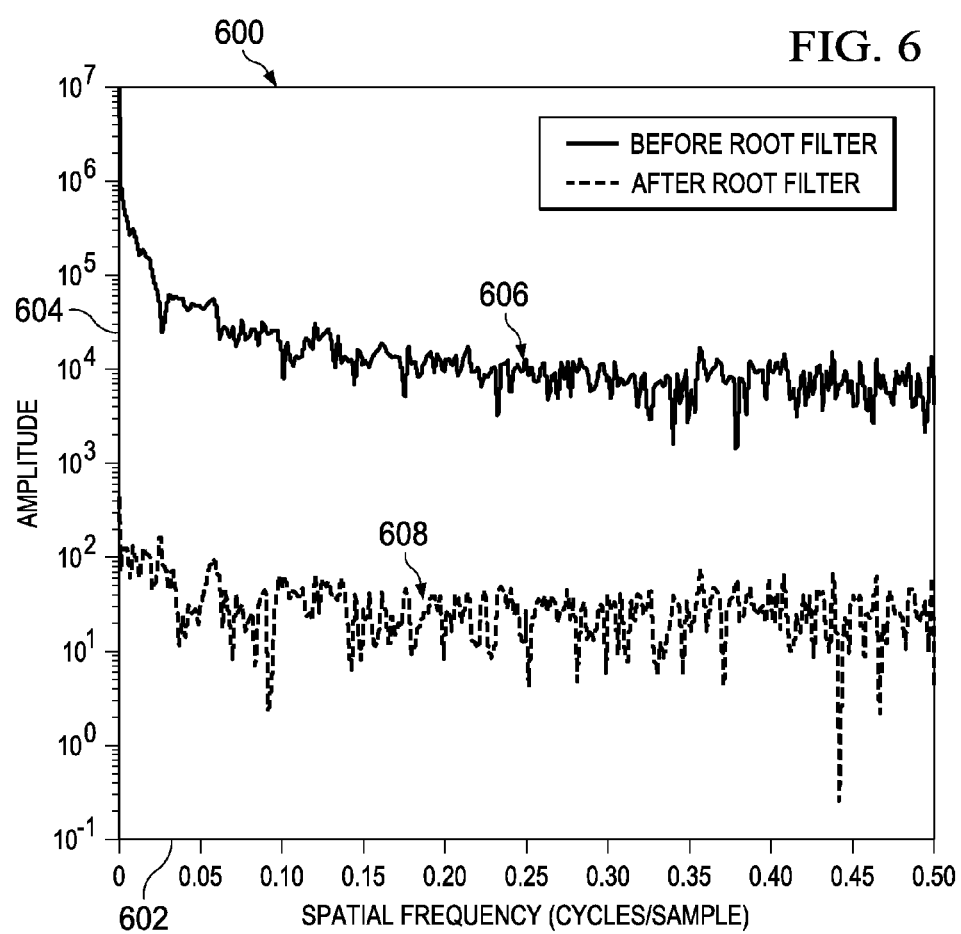
FIG. 6 is an illustration of amplitude spectrums in accordance with an advantageous embodiment.

With reference now to FIG. 6, an illustration of amplitude spectrums is depicted in accordance with an advantageous embodiment. In this illustrative example, plot 600 has horizontal axis 602 and vertical axis 604. Horizontal axis 602 is spatial frequency in cycles per sample. Vertical axis 604 is amplitude. As depicted, plot 600 includes amplitude spectrum 606 and amplitude spectrum 608.

Amplitude spectrum 606 is an example of one representation for the amplitude component of a transformed image, such as transformed image 224 in FIG. 2. Amplitude spectrum 608 is an example of one representation of the amplitude component in a filtered image, such as filtered image 230 in FIG. 2. The filtered image is the result of applying root filter 228 in FIG. 2 to transformed image 224.

As illustrated, amplitude spectrum 606 and amplitude spectrum 608 indicate that the ratio of the amplitudes for the higher-frequency content to the amplitudes of the lower-frequency content is reduced in filtered image 230 as compared to the ratio of the amplitudes for the higher-frequency content to the amplitudes of the lower-frequency content in transformed image 224. In other words, when root filter 228 is applied to transformed image 224, the amplitudes of the higher-frequency content are increased relative to the amplitudes of the lower-frequency content. In this illustrative example, the amplitudes for all frequencies in transformed image 224 are decreased when root filter 228 is applied.

Figure 7:
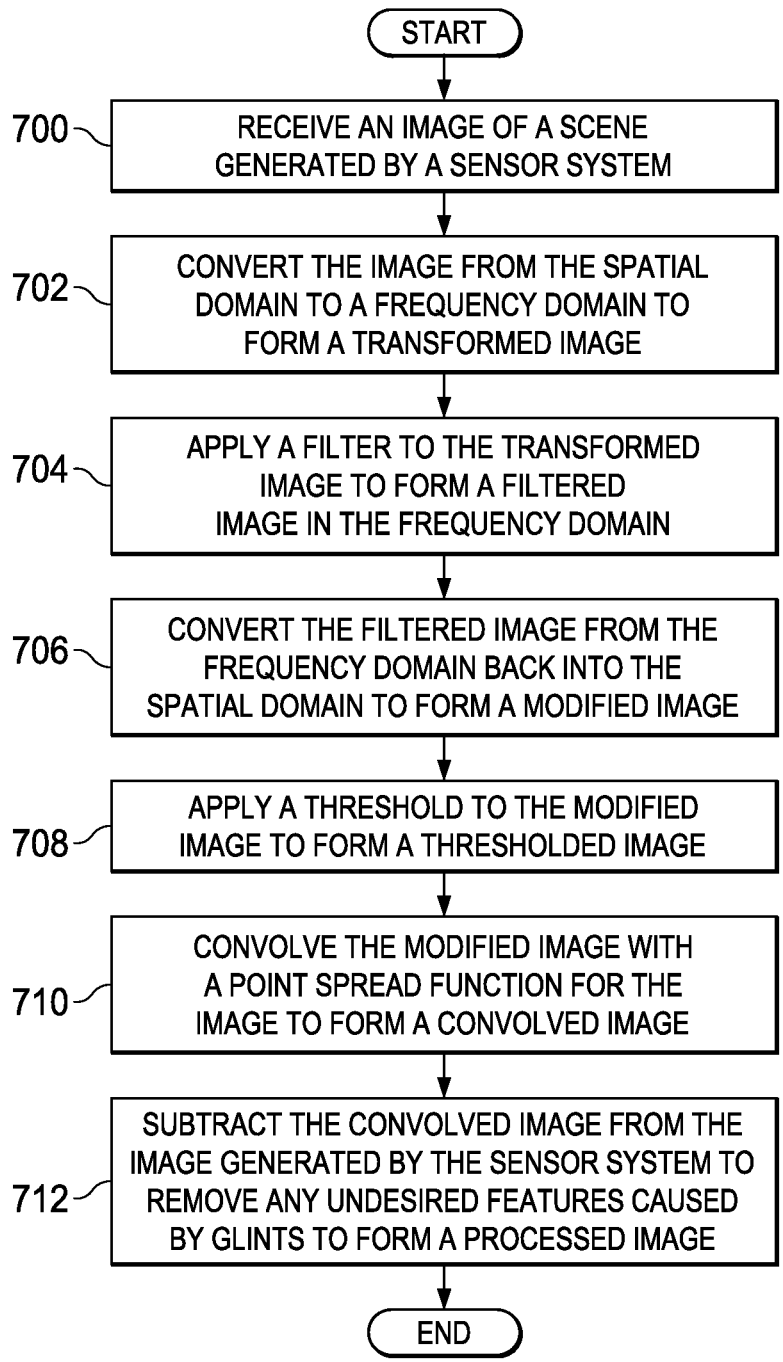
FIG. 7 is an illustration of a flowchart of a process for removing undesired features from an image in accordance with an advantageous embodiment.

With reference now to FIG. 7, an illustration of a flowchart of a process for removing undesired features from an image is depicted in accordance with an advantageous embodiment. The process illustrated in FIG. 7 may be implemented in image processing environment 100 in FIG. 1. In particular, one or more of the different advantageous embodiments may be implemented in image processor 120 in FIG. 1. Additionally, image analyzer 122 in FIG. 1 also may be used to implement some operations, depending on the particular implementation.

The process begins by receiving an image of a scene generated by a sensor system (operation 700). In this illustrative example, the sensor system comprises a number of panchromatic image sensors that generate the image as a panchromatic image. The image of the scene is generated in the spatial domain in this example.

Next, the process converts the image from the spatial domain to a frequency domain to form a transformed image (operation 702). In particular, in operation 702, the process computes a Fourier transform for the image that converts the image in the spatial domain to the transformed image in the frequency domain. The Fourier transform for the image comprises an amplitude component and a phase component. Further, in this illustrative example, the Fourier transform may be a Discrete Fourier transform (DFT) or a Fast Fourier transform (FFT).

Then, the process applies a filter to the transformed image to form a filtered image in the frequency domain (operation 704). In this illustrative example, the filter in operation 704 is a root filter. In particular, the root filter scales amplitudes for the amplitude component of the Fourier transform without changing phases for the phase component of the Fourier transform. The root filter may be configured to scale the amplitudes for the amplitude component of the Fourier transform in a non-linear manner.

Thereafter, the process converts the filtered image from the frequency domain back into the spatial domain to form a modified image (operation 706). In operation 706, an inverse Fourier transform is computed for the filtered image to convert the filtered image in the frequency domain to the modified image in the spatial domain. Intensities of any undesired features in the modified image caused by glints in the scene may be increased as compared to the intensities of undesired features in the image of the scene. In other words, the intensities of any undesired features in the modified image may be enhanced relative to other portions of the image as compared to the intensities of the undesired features in the image generated by the sensor system.

The process then applies a threshold to the modified image to form a thresholded image (operation 708). In operation 708, pixels in the modified image having values greater than the threshold are retained to form the thresholded image. Any pixels that are retained contain the undesired features caused by glints in the scene detected by the sensor system. In particular, the modified image may contain a set of bright spots. This set of bright spots corresponds to the small features that appear in the image generated by the sensor system as a result of glints in the scene.

Next, the process convolves the modified image with a point spread function for the image to form a convolved image (operation 710). The convolved image indicates a set of locations for the set of bright spots identified in the modified image. The set of locations takes into account any blurring effects that may be generated by the sensor system.

Then, the process subtracts the convolved image from the image generated by the sensor system to remove any undesired features caused by glints to form a processed image (operation 712), with the process terminating thereafter. In operation 712, subtracting the convolved image from the image generated by the sensor system removes any portions of the image at locations corresponding to the set of locations for the set of bright spots in the modified image.

Figure 8:
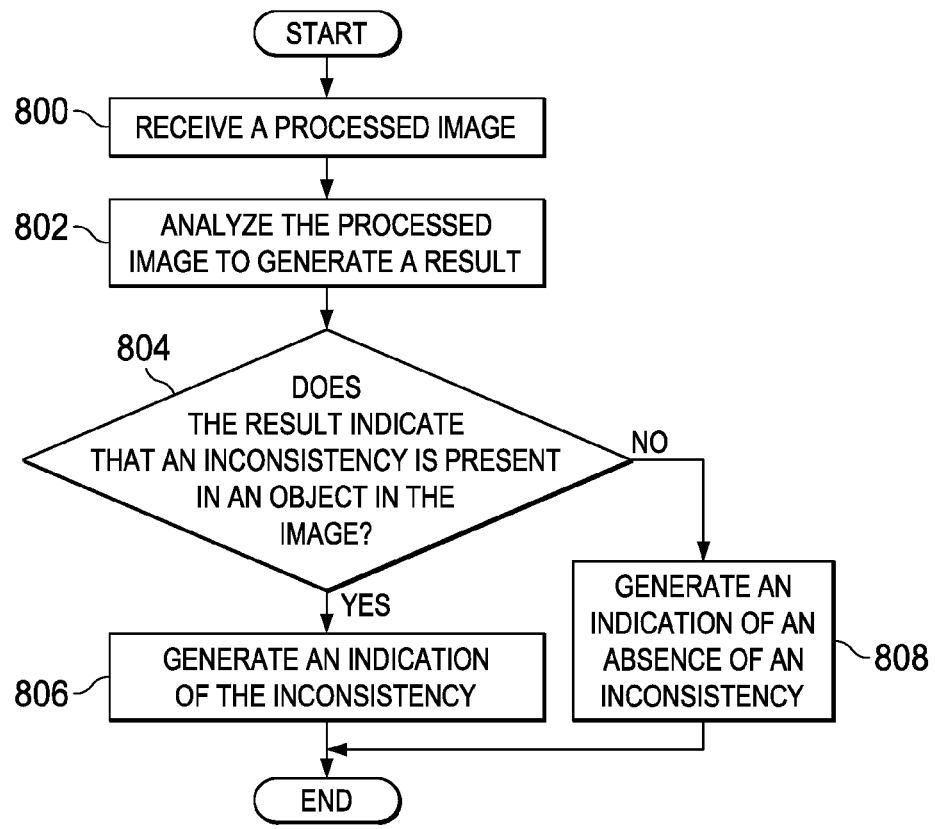
FIG. 8 is an illustration of a flowchart of a process for analyzing an image in accordance with an advantageous embodiment.

With reference now to FIG. 8, an illustration of a flowchart of a process for analyzing an image is depicted in accordance with an advantageous embodiment. The process illustrated in FIG. 8 may be implemented in image processing environment 100 in FIG. 1. In particular, this process may be implemented in image analyzer 122 in FIG. 1.

The process begins by receiving a processed image (operation 800). This processed image may be an image generated by image processor 120 in FIG. 1 using the operations described in FIG. 7. In particular, this processed image may be the processed image formed in operation 712 in FIG. 7.

The process analyzes the processed image to generate a result (operation 802). A determination is made as to whether the result indicates that an inconsistency is present in an object in the image (operation 804). If an inconsistency is present in the object, the process generates an indication of the presence of the inconsistency (operation 806), with the process terminating thereafter. The indication may be presented on a display device, sent in an email, stored in a database, or processed in some other suitable manner.

With reference again to operation 804, if an inconsistency is not present in the object, the process then generates an indication of an absence of an inconsistency (operation 808), with the process terminating thereafter.

The analysis performed in operation 802 may be performed in a number of different ways. For example, the analysis may be performed directly on the processed image. The data in the processed image may be compared to other images of the object taken at previous times. This comparison may be used to determine whether changes in the object have occurred. These changes may be used to determine whether an inconsistency is present in the object. In these illustrative examples, an inconsistency may be an undesired change in the object.

Figure 9:
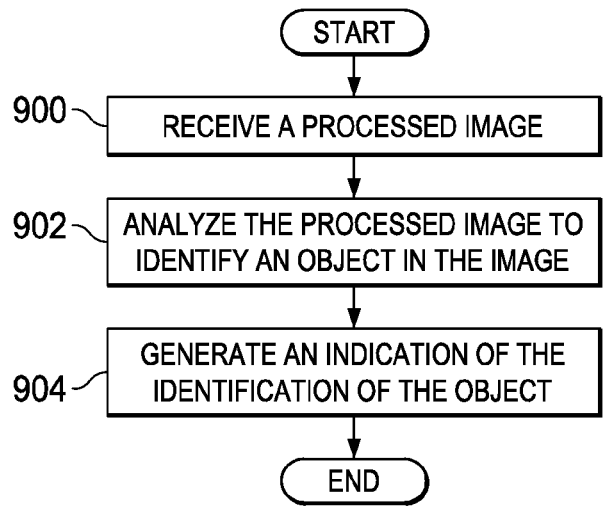
FIG. 9 is an illustration of a flowchart of a process for analyzing an image in accordance with an advantageous embodiment.

With reference now to FIG. 9, an illustration of a flowchart of a process for analyzing an image is depicted in accordance with an advantageous embodiment. The process illustrated in FIG. 9 may be implemented in image processing environment 100 in FIG. 1. In particular, this process may be implemented in image analyzer 122 in FIG. 1.

The process begins by receiving a processed image (operation 900). This processed image may be an image generated by image processor 120 using the operations described in FIG. 7. In particular, this processed image may be the processed image formed in operation 712 in FIG. 7.

The process then analyzes the processed image to identify an object in the image (operation 902). This analysis may be made in a number of different ways. For example, a database of prior images or other data may be used as a comparison to the data in the processed image. Based on this comparison, an identification of the object may be made. This identification may identify a particular object or may indicate that the object in the image is unknown.

The process then generates an indication of the identification of the object (operation 904), with the process terminating thereafter. The indication may be, for example, a report identifying the object.

Turning now to FIG. 10, an illustration of a data processing system is depicted in accordance with an advantageous embodiment. Data processing system 1000 may be used to implement one or more computers in computer system 105 in FIG. 1 in these depicted examples. In this illustrative example, data processing system 1000 includes communications framework 1002, which provides communications between processor unit 1004, memory 1006, persistent storage 1008, communications unit 1010, input/output (I/O) unit 1012, and display 1014.

Processor unit 1004 serves to execute instructions for software that may be loaded into memory 1006. Processor unit 1004 may be a number of processors, a multi-processor core, or some other type of processor, depending on the particular implementation. A number, as used herein with reference to an item, means one or more items. Further, processor unit 1004 may be implemented using a number of heterogeneous processor systems in which a main processor is present with secondary processors on a single chip. As another illustrative example, processor unit 1004 may be a symmetric multi-processor system containing multiple processors of the same type.

Memory 1006 and persistent storage 1008 are examples of storage devices 1016. A storage device is any piece of hardware that is capable of storing information, such as, for example, without limitation, data, program code in functional form, and/or other suitable information either on a temporary basis and/or a permanent basis. Storage devices 1016 may also be referred to as computer readable storage devices in these examples. Memory 1006, in these examples, may be, for example, a random access memory or any other suitable volatile or non-volatile storage device. Persistent storage 1008 may take various forms, depending on the particular implementation.

For example, persistent storage 1008 may contain one or more components or devices. For example, persistent storage 1008 may be a hard drive, a flash memory, a rewritable optical disk, a rewritable magnetic tape, or some combination of the above. The media used by persistent storage 1008 also may be removable. For example, a removable hard drive may be used for persistent storage 1008.

Communications unit 1010, in these examples, provides for communications with other data processing systems or devices. In these examples, communications unit 1010 is a network interface card. Communications unit 1010 may provide communications through the use of either or both physical and wireless communications links.

Input/output unit 1012 allows for input and output of data with other devices that may be connected to data processing system 1000. For example, input/output unit 1012 may provide a connection for user input through a keyboard, a mouse, and/or some other suitable input device. Further, input/output unit 1012 may send output to a printer. Display 1014 provides a mechanism to display information to a user.

Instructions for the operating system, applications, and/or programs may be located in storage devices 1016, which are in communication with processor unit 1004 through communications framework 1002. In these illustrative examples, the instructions are in a functional form on persistent storage 1008. These instructions may be loaded into memory 1006 for execution by processor unit 1004. The processes of the different embodiments may be performed by processor unit 1004 using computer-implemented instructions, which may be located in a memory, such as memory 1006.

These instructions are referred to as program code, computer usable program code, or computer readable program code that may be read and executed by a processor in processor unit 1004. The program code in the different embodiments may be embodied on different physical or computer readable storage media, such as memory 1006 or persistent storage 1008.

Program code 1018 is located in a functional form on computer readable media 1020 that is selectively removable and may be loaded onto or transferred to data processing system 1000 for execution by processor unit 1004. Program code 1018 and computer readable media 1020 form computer program product 1022 in these examples. In one example, computer readable media 1020 may be computer readable storage media 1024 or computer readable signal media 1026.

Computer readable storage media 1024 may include, for example, an optical or magnetic disk that is inserted or placed into a drive or other device that is part of persistent storage 1008 for transfer onto a storage device, such as a hard drive, that is part of persistent storage 1008. Computer readable storage media 1024 also may take the form of a persistent storage, such as a hard drive, a thumb drive, or a flash memory, that is connected to data processing system 1000. In some instances, computer readable storage media 1024 may not be removable from data processing system 1000.

In these examples, computer readable storage media 1024 is a physical or tangible storage device used to store program code 1018 rather than a medium that propagates or transmits program code 1018. Computer readable storage media 1024 is also referred to as a computer readable tangible storage device or a computer readable physical storage device. In other words, computer readable storage media 1024 is a media that can be touched by a person.

Alternatively, program code 1018 may be transferred to data processing system 1000 using computer readable signal media 1026. Computer readable signal media 1026 may be, for example, a propagated data signal containing program code 1018. For example, computer readable signal media 1026 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 1018 may be downloaded over a network to persistent storage 1008 from another device or data processing system through computer readable signal media 1026 for use within data processing system 1000. For instance, program code stored in a computer readable storage medium in a server data processing system may be downloaded over a network from the server to data processing system 1000. The data processing system providing program code 1018 may be a server computer, a client computer, or some other device capable of storing and transmitting program code 1018.

The different components illustrated for data processing system 1000 are not meant to provide architectural limitations to the manner in which different embodiments may be implemented. The different advantageous embodiments may be implemented in a data processing system including components in addition to or in place of those illustrated for data processing system 1000. Other components shown in FIG. 10 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 1004 may take the form of a hardware unit that has circuits that are manufactured or configured for a particular use. This type of hardware may perform operations without needing program code to be loaded into a memory from a storage device to be configured to perform the operations.

For example, when processor unit 1004 takes the form of a hardware unit, processor unit 1004 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a field programmable logic array, a field programmable gate array, and other suitable hardware devices. With this type of implementation, program code 1018 may be omitted, because the processes for the different embodiments are implemented in a hardware unit.

In still another illustrative example, processor unit 1004 may be implemented using a combination of processors found in computers and hardware units. Processor unit 1004 may have a number of hardware units and a number of processors that are configured to run program code 1018. With this depicted example, some of the processes may be implemented in the number of hardware units, while other processes may be implemented in the number of processors.

In another example, a bus system may be used to implement communications framework 1002 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of devices that transmit data, receive data, or transmit and receive data. A communications unit may be, for example, a modem or a network adapter, two network adapters, or some combination thereof. Further, a memory may be, for example, memory 1006, or a cache, such as found in an interface and memory controller hub that may be present in communications framework 1002.

Thus, the different advantageous embodiments provide a method and apparatus for removing undesired features caused by glints from an image. In the different advantageous embodiments, an undesired feature may be a feature that makes analyzing the image more difficult and/or time-consuming than desired.

In one advantageous embodiment, a method for removing undesired features in an image is provided. An image is converted from a spatial domain to a frequency domain to form a transformed image. A filter is applied to the transformed image to form a filtered image in the frequency domain. The filtered image is converted from the frequency domain back into the spatial domain to form a modified image. An intensity of an undesired feature in the modified image is increased as compared to the intensity of the undesired feature in the image. The undesired feature is removed from the image using the modified image to form a processed image.

The description of the different advantageous embodiments has been presented for purposes of illustration and description and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for removing an undesired feature in an image, the method comprising:
   converting the image from a spatial domain to a frequency domain to form a transformed image;
   applying a filter to the transformed image to form a filtered image in the frequency domain;
   converting the filtered image from the frequency domain back into the spatial domain to form a modified image, wherein an intensity of the undesired feature in the modified image is increased as compared to the intensity of the undesired feature in the image; and
   removing the undesired feature from the image, wherein removing the undesired feature comprises:
      applying a threshold to the modified image in which pixels in the modified image having values greater than the threshold are retained to form a thresholded image;
      convolving the modified image with a point spread function for the image to form a convolved image, wherein the convolved image indicates a first location for the undesired feature in the convolved image that corresponds to a second location for the undesired feature in the image; and
      subtracting the convolved image from the image to form a processed image, wherein a portion of the image at the second location for the undesired feature in the image is removed from the image to remove the undesired feature.

2. The method of claim 1, wherein the image is of a scene and wherein the undesired feature in the image is a bright spot caused by a glint in the scene.

3. The method of claim 1, wherein converting the image from the spatial domain to the frequency domain to form the transformed image comprises:
   computing a Fourier transform for the image that converts the image from the spatial domain to the transformed image in the frequency domain.

4. The method of claim 3, wherein applying the filter to the transformed image to form the filtered image in the frequency domain comprises:
   changing an amplitude component for the Fourier transform of the image without changing a phase component for the Fourier transform of the image to form the filtered image.

5. The method of claim 4, wherein changing the amplitude component for the Fourier transform of the image without changing the phase component for the Fourier transform of the image to form the filtered image comprises:
   scaling amplitudes for the amplitude component for the Fourier transform of the image without affecting phases in the phase component for the Fourier transform using a root filter to form the filtered image, wherein the root filter scales the amplitudes in a non-linear manner.

6. The method of claim 1, wherein converting the filtered image from the frequency domain back into the spatial domain to form the modified image comprises:
   computing an inverse Fourier transform for the filtered image that converts the filtered image from the frequency domain to the spatial domain, wherein the intensity of the undesired feature in the modified image is increased as compared to the intensity of the undesired feature in the image.

7. The method of claim 1 further comprising:
   identifying characteristics of an object in the image using the processed image.

8. The method of claim 1 further comprising:
   identifying an object in the image using the processed image.

9. The method of claim 1 further comprising:
   determining whether an inconsistency is present in an object in the image using the processed image.

10. The method of claim 9, wherein determining whether the inconsistency is present in the object using the processed image comprises:
    comparing the processed image with another image of the object to form a comparison; and
    determining whether the inconsistency is present using the comparison.

11. An apparatus comprising:
    a computer system configured to convert an image from a spatial domain to a frequency domain to form a transformed image; apply a filter to the transformed image to form a filtered image in the frequency domain; convert the filtered image from the frequency domain back into the spatial domain to form a modified image, wherein an intensity of an undesired feature in the modified image is increased as compared to the intensity of the undesired feature in the image; and remove the undesired feature from the image, wherein in being configured to remove the undesired feature, the computer system is configured to apply a threshold to the modified image in which pixels in the modified image having values greater than the threshold are retained to form a thresholded image; convolve the modified image with a point spread function for the image to form a convolved image, wherein the convolved image indicates a first location for the undesired feature in the convolved image that corresponds to a second location for the undesired feature in the image; and subtract the convolved image from the image to form a processed image, wherein a portion of the image at the second location for the undesired feature in the image is removed from the image to remove the undesired feature.

12. The apparatus of claim 11 further comprising:
    a sensor system configured to generate the image of a scene, wherein the undesired feature in the image is a bright spot in the image caused by a glint in the scene.

13. The apparatus of claim 11, wherein in being configured to convert the image from the spatial domain to the frequency domain to form the transformed image, the computer system is configured to compute a Fourier transform for the image that converts the image from the spatial domain to the transformed image in the frequency domain.

14. The apparatus of claim 13, wherein in being configured to apply the filter to the transformed image to form the filtered image in the frequency domain, the computer system is configured to scale amplitudes for an amplitude component for the Fourier transform of the image without affecting phases in a phase component for the Fourier transform using a root filter to form the filtered image, wherein the root filter scales the amplitudes in a non-linear manner.

15. A vehicle inspection system comprising:
    a sensor system configured to generate images of a vehicle;
    an image processor configured to receive an image from the sensor system; convert the image from a spatial domain to a frequency domain to form a transformed image; apply a filter to the transformed image to form a filtered image in the frequency domain; convert the filtered image from the frequency domain back into the spatial domain to form a modified image, wherein an intensity of an undesired feature in the modified image is increased as compared to the intensity of the undesired feature in the image; and remove the undesired feature from the image wherein in being configured to remove the undesired feature from the image using the modified image to form the processed image, a computer system is configured to apply a threshold to the modified image in which pixels in the modified image having values greater than the threshold are retained to form a thresholded image; convolve the modified image with a point spread function for the image to form a convolved image, wherein the convolved image indicates a first location for the undesired feature in the convolved image that corresponds to a second location for the undesired feature in the image; and subtract the convolved image from the image to form the processed image, wherein a portion of the image at the second location for the undesired feature in the image is removed from the image to remove the undesired feature; and an image analyzer configured to analyze the processed image to determine whether an inconsistency is present in the vehicle.

16. The vehicle inspection system of claim 15, wherein in being configured to analyze the processed image to determine whether the inconsistency is present, the image analyzer is configured to compare the processed image with another image of the vehicle to form a comparison; and determine whether the inconsistency is present using the comparison.

17. The vehicle inspection system of claim 15 further comprising:

a display system, wherein the image analyzer is configured to display an indication of whether the inconsistency is present in the vehicle on the display system.

18. The vehicle inspection system of claim 15, wherein the image analyzer is further configured to generate a report indicating whether the inconsistency is present in the vehicle.

* * * * *